(12) United States Patent
Hikazudani et al.

(10) Patent No.: US 9,399,207 B2
(45) Date of Patent: Jul. 26, 2016

(54) PREPARATION METHOD OF DENITRATION CATALYST

(75) Inventors: Susumu Hikazudani, Osaka (JP); Naoe Hino, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 220 days.

(21) Appl. No.: 14/007,084

(22) PCT Filed: Feb. 2, 2012

(86) PCT No.: PCT/JP2012/052346
§ 371 (c)(1),
(2), (4) Date: Sep. 24, 2013

(87) PCT Pub. No.: WO2012/132540
PCT Pub. Date: Oct. 4, 2012

(65) Prior Publication Data
US 2014/0018236 A1    Jan. 16, 2014

(30) Foreign Application Priority Data
Mar. 25, 2011 (JP) .................... 2011-067082

(51) Int. Cl.
*B01J 23/30* (2006.01)
*B01J 21/06* (2006.01)
(Continued)

(52) U.S. Cl.
CPC .......... *B01J 23/30* (2013.01); *B01D 53/8628* (2013.01); *B01J 21/063* (2013.01); *B01J 23/22* (2013.01); *B01J 35/023* (2013.01);
(Continued)

(58) Field of Classification Search
USPC .......... 502/248, 309, 350; 423/594.8, 594.17, 423/598
See application file for complete search history.

(56) References Cited

U.S. PATENT DOCUMENTS

| 7,087,551 | B2 * | 8/2006 | Komada et al. ............... 502/211 |
| 8,133,833 | B2 * | 3/2012 | Hikazudani et al. .......... 502/159 |
| 2008/0009408 | A1 * | 1/2008 | Birke et al. .................... 502/107 |
| 2008/0248943 | A1 * | 10/2008 | Fukuju et al. .................. 502/24 |

FOREIGN PATENT DOCUMENTS

JP    08-141398 A    6/1996
JP    10-099684 A    4/1998
(Continued)

OTHER PUBLICATIONS

Navarro et al., Vanadium recovery from oil fly ash by leaching, precipitation and solvent extraction processes, Waste Management 27 (2007) 425-438.*

*Primary Examiner* — Colin W Slifka
(74) *Attorney, Agent, or Firm* — Locke Lord LLP

(57) ABSTRACT

Provided is a preparation method of a denitration catalyst for treating nitrogen oxides contained in exhaust gas discharged from gas turbines for generating plants, coil fired boilers, etc., in which the catalytic activity can be improved, and furthermore, an increase of the cost of producing the catalyst is not involved. The preparation method of a denitration catalyst used when reacting nitrogen oxides with reducing agent ammonia to decompose the nitrogen oxides into nitrogen and water, and including titanium oxide and vanadium as catalytic active ingredients thereof, is characterized in that the vanadium precursor is ammonium metavanadate powder, the ammonium metavanadate powder containing particles having a particle diameter of 10 μm or less in a cumulative ratio of 20% or more. The ammonium metavanadate powder is preferably a reclaimed product including vanadium recovered from petroleum-based combustion ash such as heavy oil ash.

4 Claims, 2 Drawing Sheets

Particle size distribution of AMV(b)

(51) Int. Cl.
*B01J 23/22* (2006.01)
*B01J 35/02* (2006.01)
*B01D 53/86* (2006.01)

(52) U.S. Cl.
CPC .............. *B01D 2251/2062* (2013.01); *B01D 2255/20707* (2013.01); *B01D 2255/20723* (2013.01); *B01D 2255/9202* (2013.01); *B01D 2257/404* (2013.01); *B01D 2258/0283* (2013.01)

(56) References Cited

FOREIGN PATENT DOCUMENTS

| | | |
|---|---|---|
| JP | 2005-319422 A | 11/2005 |
| JP | 2006-223959 A | 8/2006 |
| JP | 2008-012379 A | 1/2008 |
| JP | 2008-155133 A | 7/2008 |

\* cited by examiner

Particle size distribution of AMV(a)

Particle size distribution of AMV(b)

PREPARATION METHOD OF DENITRATION CATALYST

TECHNICAL FIELD

The present invention relates to a preparation method of a denitration catalyst for treating nitrogen oxides contained in exhaust gas discharged from, for example, a gas turbines for generating plants, coal fired boilers, etc.

BACKGROUND ART

Denitration catalysts used for treating nitrogen oxides contained in exhaust gas generally include titania having vanadium supported thereon. Denitration catalysts have been designed in related arts to increase the supporting amount of the catalyst and the vanadium concentration in the catalyst, in order to enhance the denitration capability thereof.

The present inventors have prepared denitration catalysts by a method of allowing titania to be supported on a carrier of a ceramic fiber sheet or a carrier which is molded from a ceramic fiber sheet and processed into honeycomb shape, and immersing the carrier in a vanadium solution to impregnate the carrier with vanadium, thereby allowing the carrier to support vanadium, or a method of preparing a slurry by adding vanadium into a titania slurry containing titania powder suspended in silica sol, and allowing the same carrier as above to support the slurry, as described in PTL 1 below.

PATENT LITERATURE

PTL 1: JP-A-2008-155133

DISCLOSURE OF INVENTION

Technical Problem

However, since all the methods in the related arts use a large amount of materials, there has been a problem that an increase in the cost of the catalyst is involved therein.

An object of the present invention is to solve the foregoing problem in the related arts to provide a preparation method of a denitration catalyst in which the catalytic activity can be enhanced and, in addition, an increase in the cost of producing the catalyst is not involved.

Solution to Problem

The present inventors, as a result of an intensive study in view of the above circumstances, found that the catalytic capability can be enhanced by using a material containing particles having a small particle size as the precursor powder including a metal compound which is an active ingredient of the catalyst, thereby completing the invention.

For achieving the above purpose, the invention of a preparation method of a denitration catalyst according to claim 1 is directed to a method for preparing a denitration catalyst which is used when reacting nitrogen oxides with a reducing agent ammonia to decompose the nitrogen oxides into nitrogen and water and which includes titanium oxide, vanadium and tungsten as catalytic active ingredients thereof, characterized in that a precursor of the vanadium is ammonium metavanadate powder, the ammonium metavanadate powder containing particles having a particle diameter of 10 μm or less in a cumulative content of 20% or more.

It is preferred here that the ammonium metavanadate powder contains particles having a particle diameter of 10 μm or less in a cumulative content of 25% or more.

The invention according to claim 2 is directed to the method for preparing a denitration catalyst set forth in the claim 1, characterized in that the ammonium metavanadate powder is a reclaimed product including vanadium recovered from petroleum-based combustion ash, such as heavy oil ash.

Advantageous Effects of Invention

The preparation method of a denitration catalyst of the invention is a method for preparing a denitration catalyst which is used when reacting nitrogen oxides with ammonia acting as a reducing agent to decompose the nitrogen oxides into nitrogen and water and which includes titanium oxide, vanadium and tungsten as catalytic active ingredients thereof, characterized in that a precursor of the vanadium is ammonium metavanadate powder, the ammonium metavanadate powder containing particles having a particle diameter of 10 μm or less in a cumulative content of 20% or more. In accordance with the invention of claim 1, effects are exhibited that the catalytic activity of the denitration catalyst can be enhanced, and in addition, an increase in the cost of producing the catalyst is not involved.

The invention of claim 2 is the method for preparing a denitration catalyst according to the claim 1, characterized in that the ammonium metavanadate powder is a reclaimed product including vanadium recovered from petroleum-based combustion ash, such as heavy oil ash. In accordance with the invention of the claim 2, the catalytic activity of the denitration catalyst can be enhanced, and in addition, the cost of producing the catalyst is kept very low since the ammonium metavanadate powder is a reclaimed product through recovery.

DESCRIPTION OF EMBODIMENTS

Next, embodiments of the invention will be described, but the invention is not to be limited thereto.

The preparation method of a denitration catalyst according to the invention is a method for preparing a denitration catalyst which is used when reacting nitrogen oxides with ammonia acting as a reducing agent to decompose the nitrogen oxides into nitrogen and water and which includes titanium oxide, vanadium and tungsten as catalytic active ingredients thereof, characterized in that a precursor of the vanadium is ammonium metavanadate powder, the ammonium metavanadate powder containing particles having a particle diameter of 10 μm or less in a cumulative content of 20% or more.

The ammonium metavanadate powder here preferably contains particles having a particle diameter of 10 mm or less in a cumulative content of 25% or more.

In addition, the ammonium metavanadate powder is preferably a reclaimed product including vanadium recovered from petroleum-based combustion ash, such as heavy oil ash.

Incidentally, the denitration catalytic action is exhibited mainly by titanium oxide and vanadium, among the above-mentioned catalytic active ingredients of the denitration catalyst, and tungsten functions as a co-catalyst.

Figure 1:
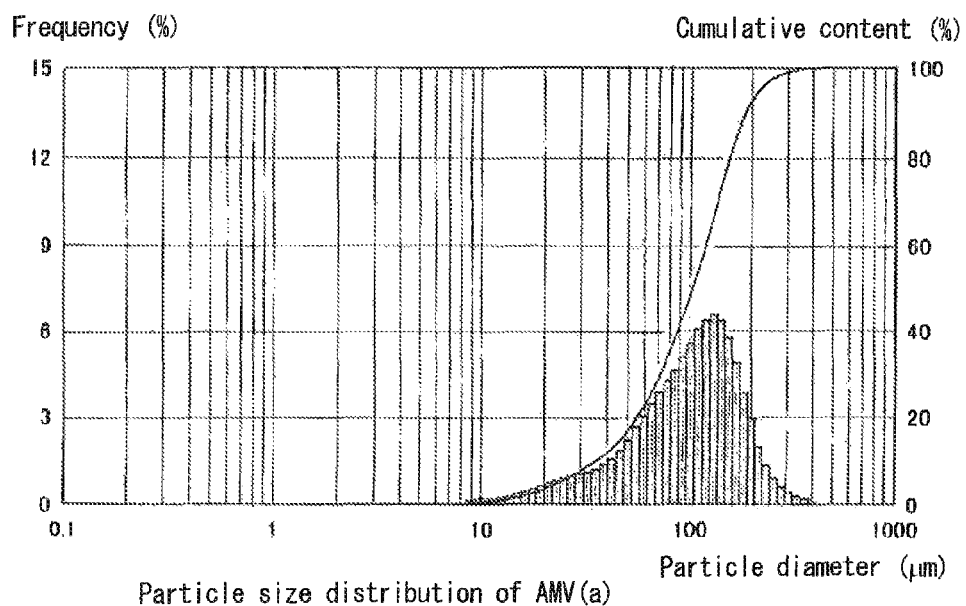
FIG. 1 is a graph showing a result of a particle size distribution measurement of ammonium metavanadate (AMV) (a) powder used in a production of a denitration catalyst in a related art.
Figure 2:
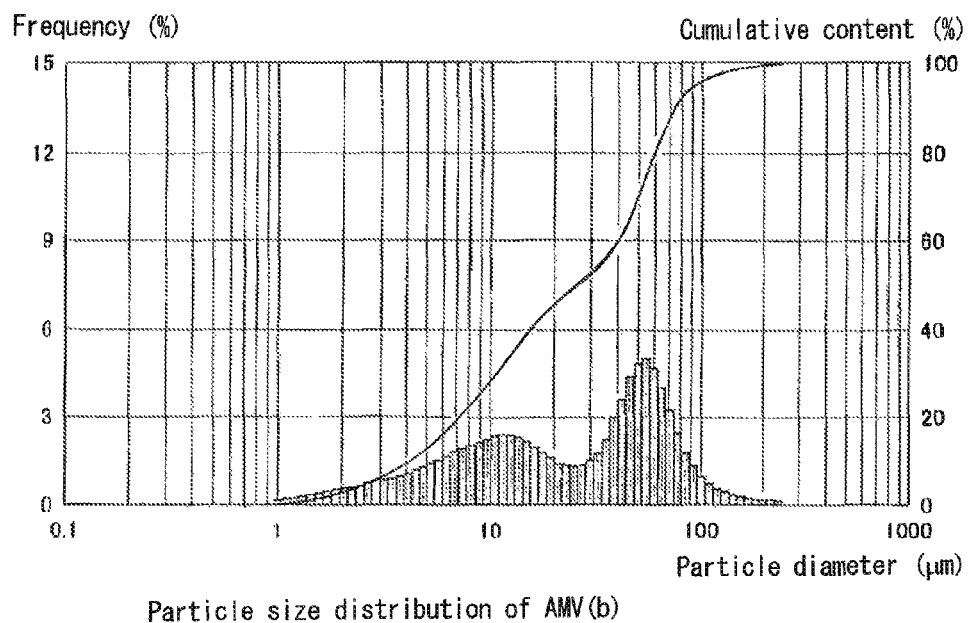
FIG. 2 is a graph showing a result of a particle size distribution measurement of ammonium metavanadate (AMV) (b) used in the production of a denitration catalyst of the invention.

Results of particle size distribution measurement of two kinds of ammonium metavanadate (hereinafter, referred to as AMV) are shown in FIGS. 1 and 2.

The AMV (a) powder shown in FIG. 1 is an ammonium metavanadate powder having a large particle diameter which is used in a preparation method of a denitration catalyst in a related art, and contains little particles having a particle diameter of 10 µm or less.

In contrast, the AMV (b) powder shown in FIG. 2 is an ammonium metavanadate powder having a small particle diameter which is used in the preparation method of a denitration catalyst of the invention, and particles having a particle diameter of 10 µm or less are contained in a cumulative content of 25%, particles having a particle diameter of more than 10 µm and 27 µm or less are contained in a cumulative content of 25%, particles having a particle diameter of more than 27 µm and 60 µm or less are contained in a cumulative content of 30%, and particles having a particle diameter of more than 60 µm and 250 µm or less are contained in a cumulative content of 20%.

Furthermore, when viewed in terms of the particle diameter at the cumulative content of 50% of the ammonium metavanadate powders in. FIGS. 1 and 2, the particle diameter is 103.4 µm in the AMV (a) powder which is used for the preparation method of a denitration catalyst in a related art, while the particle diameter is 26.41 µm in the AMV (b) powder which is used for the preparation method of a denitration catalyst of the invention, and it can be seen that the particle diameter of the AMV (b) powder used for the preparation method of a denitration catalyst of the invention is smaller than that of the AMV (a) powder used for the method in a related art.

The AMV (b) powder used for the preparation method of a denitration catalyst of the invention, is an ammonium metavanadate powder having a small particle diameter which is used for the preparation method of a denitration catalyst the invention, and particles having a particle diameter of 10 µm or less are contained in a cumulative content of from 20 to 30%, preferably from 23 to 27%, particles having a particle diameter of more than 10 µm and 27 µm or less are contained in a cumulative content of from 20 to 30%, preferably from 23 to 27%, particles having a particle diameter of more than 27 µm and 60 µm or less are contained in a cumulative content of from 25 to 35%, preferably from 28 to 32%, and particles having a particle diameter of more than 60 µm and 250 µm or less are contained in a cumulative content of from 15 to 25%, preferably from 17 to 23%.

The AMV (b) powder having a small particle diameter which is used for the preparation method of a denitration catalyst of the invention is a reclaimed product (for example, manufactured by Kajima Kita Electric Power Corp.) including vanadium recovered from petroleum-based combustion ash, such as heavy oil ash.

In comparison between the catalysts prepared using these kinds of AMV in denitration capability, it was found that the catalyst using the AMV (b) powder having a small particle diameter which is used in the preparation method of a denitration catalyst of the invention exhibits about 10% higher denitration capability than the other AMV (a) powder used in the method in a related art.

The reason of that is considered as follows. That is, the use of the AMV (b) powder having a smaller particle diameter in the preparation of the denitration catalyst makes it possible to reduce the particle size of the ammonium metavanadate powder which is adsorbed onto titania to thereby improve the dispersibility, resulting in enhancing the denitration capability.

Thus, by using the AMV (b) powder having a small particle diameter which is used in the preparation method of a denitration catalyst of the invention, as described above, it has been possible to enhance the catalytic capability without increasing the amount of the material used.

As the AMV (b) powder having a small particle diameter, an AMV powder obtained by grinding a commercially available agent to a predetermined size may be used, but it is more preferred that a reclaimed product from petroleum-based combustion ash such as heavy oil ash is used as described, above, since not only the trouble of the grinding is avoided, but also the cost of producing the catalyst is kept very low because it is a reclaimed product through recovery.

In the AMV (b) powder used in the preparation method of a denitration catalyst of the invention, in the case that particles having a particle diameter of 10 µm or less are contained in a cumulative content of less than 20% in the ammonium metavanadate powder, the amount of the ammonium metavanadate powder particles which are adsorbed on titania is small and a sufficient catalytic activity is not obtained, and therefore the case is not preferred. In the case that particles having a particle diameter of 10 µm or less are contained in a cumulative content of more than 30% in the ammonium metavanadate powder, the ammonium metavanadate powder is difficult to sink into slurry in preparation of the slurry as described later to extend the mixing time because of a large amount of the ammonium metavanadate powder having a small particle diameter, and therefore the case is not preferred.

In the AMV (b) powder used in the preparation method of a denitration catalyst of the invention, in addition to the ammonium metavanadate powder having a small particle diameter as described above, ammonium metavanadate powder having a relatively large particle diameter is required to be contained. It is required that, besides the ammonium metavanadate powder particles having a small particle diameter, that is, having a particle diameter of 10 µm or less, ammonium metavanadate powder particles having a particle diameter of more than 10 µm and 27 µm or less, ammonium metavanadate powder particles having a particle diameter of more than 27 µm and 60 µm or less, and ammonium metavanadate powder particles having a particle diameter of more than 60 µm and 250 µm or less, are required to be contained respectively in the cumulative contents of the above-mentioned ranges.

For carrying out the preparation method of a denitration catalyst of the invention, there are, for example, the following two embodiments.

Firstly, a titania (titanium oxide) powder is added to a mixture liquid of a silica sol and water to prepare a slurry. Next, to this slurry, an ammonium metavanadate (AMV) (b) powder having a small particle diameter which contains particles having a particle diameter of 10 µm or less in a cumulative content of 20% or more is added in a predetermined proportion, and the slurry is stirred and then left to stand to allow the titania to adsorb the ammonium metavanadate. Then, to the resulting slurry, an aqueous solution of ammonium metatungstate (hereinafter, referred to as AMT) is added in a predetermined proportion, and the slurry is stirred and then left to stand. A honeycomb structure obtained by molding a ceramic fiber sheet is immersed in the thus prepared slurry to allow the honeycomb structure to support a denitration catalyst precursor substance in the slurry, and the honeycomb structure taken out from the slurry is dried and then calcined, thereby preparing a honeycomb structure including a denitration catalyst.

Secondly, a titania (titanium oxide) powder is added to a mixture liquid of a silica sol and water in a predetermined proportion to prepare a slurry. Then, a honeycomb structure obtained by molding a ceramic fiber sheet, for example, is immersed in the slurry to allow the honeycomb structure to support the titania powder in the slurry, and the honeycomb structure taken out from the slurry is dried and then calcined. This honeycomb structure having the titania powder supported thereon is immersed in an aqueous solution of an ammonium metavanadate AMV (b) powder having a small particle diameter which contains particles having a particle diameter of 10 μm or less in a cumulative content of 20% or more, to allow the honeycomb structure to further support the AMV (b), and the honeycomb structure taken out from the aqueous solution is dried and then calcined. The honeycomb structure having the titania powder and the ammonium metavanadate (AMV) (b) supported thereon is further immersed in an aqueous solution of ammonium metatungstate (AMT) to allow the honeycomb structure to further support the ammonium metatungstate, and the taken-out honeycomb structure is dried and then calcined, thereby preparing a honeycomb structure including a denitration catalyst.

EXAMPLE

Next, the examples of the invention will be described together with comparative examples, but the present invention is not to be limited to these examples.

Example 1

A denitration catalyst was prepared according to the method of the invention as follows. First, a titania (titanium oxide) powder (trade name DT-51, manufactured by Millennium Specialty Chemicals Inc.) was added to a mixture liquid of silica sol (trade name Snowtex O, manufactured by Nissan Chemical Industries, Ltd.) and water (mixing ratio, 100:40, in parts by weight) in an amount of 80 parts by weight based on 100 parts by weight of the silica sol, thereby preparing a slurry. Then, to this slurry, an ammonium metavanadate (AMV) (b) powder having a small particle diameter having a particular size distribution shown in the above FIG. 2 was added in an amount of 4.8 parts by weight based on 100 parts by weight of the silica sol, and the slurry was stirred at ordinary temperature for 1 minute and left to stand for 2 hours, thereby allowing the titania to adsorb the ammonium metavanadate.

As the AMV (b) powder, a reclaimed product including vanadium recovered from petroleum-based combustion ash such as heavy oil ash (manufactured by Kashima Kita Electric Power Corp.) was used. The ammonium metavanadate powder is one containing particles having a particle diameter of 10 μm or less in a cumulative content of 25%, particles having a particle diameter of more than 10 μm and 27 μm or less in a cumulative content of 25%, particles having a particle diameter of more than 27 μm and 60 μm or less in a cumulative content of 30%, and particles having a particle diameter of more than 60 μm and 250 μm or less in a cumulative content of 20%.

Next, an aqueous solution of ammonium metatungstate (AMT) (50 weight % aqueous solution in terms of $WO_3$ (trade name MW-2, manufactured by Nippon inorganic Colour and Chemical Co., Ltd.)) was added to the above-obtained slurry in an amount of 8.64 parts by weight based on 100 parts by weight of the silica sol, and the slurry was stirred at an ordinary temperature for 1 minute and then left to stand for 1 hour.

A honeycomb structure (manufactured by Nichias Corporation) obtained by molding a ceramic fiber sheet was immersed in the thus prepared slurry for 10 minutes to allow the honeycomb structure to support the denitration catalyst precursor substance in the slurry, and the honeycomb structure taken out from the slurry was dried at a temperature of 110° C. for 1 hour. The dried honeycomb structure was calcined at a temperature of 400° C. for 1 hour, thereby preparing a honeycomb structure including a denitration catalyst.

Comparative Example 1

For the purpose of the comparison, a denitration catalyst was prepared according to a similar procedure as in the Example 1. The difference of the procedure here from that in the Example 1 is that an ammonium metavanadate (AMV) (a) powder having a large particle diameter in a related art which has a particle size distribution shown in the FIG. 1 (manufactured by Taiyo Koko Co., Ltd.) was used here.

Example 2

A denitration catalyst was prepared according to the method of the invention as follows. First, a titania (titanium oxide) powder (trade name DT-51, manufactured by Millennium Specialty Chemicals Inc.) was added to a mixture liquid of a silica sol (trade name Snowtex O, manufactured by Nissan Chemical Industries, Ltd.) and water (mixing ratio, 100:40, in parts by weight) in an amount of 80 parts by weight based on 100 parts by weight of the silica sol, thereby preparing a slurry. A honeycomb structure (manufactured by Nichias Corporation) obtained by molding a ceramic fiber sheet was immersed in the slurry for 10 minutes to allow the honeycomb structure to support the titania powder in the slurry, and the honeycomb structure taken out from the slurry was dried at a temperature of 110° C. for 1 hour. The dried honeycomb structure was calcined at a temperature of 500° C. for 1 hour.

Next, the honeycomb structure having titania powder supported thereon was immersed in an aqueous solution of the ammonium metavanadate (AMV) (b) powder (manufactured by Kajima Kita Electric Power Corp.) having a small particle diameter which has a particle size distribution shown in the FIG. 2 (an aqueous solution obtained by adding 0.275 parts by weight of the AMV (b) powder to 100 parts by weight of water) to allow the honeycomb structure to further support the AMV (b), and the honeycomb structure taken out from the aqueous solution was dried at a temperature of 110° C. and then calcined at a temperature of 220° C. for 1 hour.

The honeycomb structure having the titania powder and the ammonium metavanadate (AMV) (b) supported thereon was further immersed in an aqueous solution of ammonium metatungstate (an aqueous solution obtained by adding 9.47 parts by weight of a 50 weight % aqueous solution in terms of $WO_3$ (trade name MW-2, manufactured by Nippon Inorganic Colour and Chemical Co., Ltd.) to 100 parts by weight of water), allow the honeycomb structure to further support the ammonium metatungstate, and the taken-out honeycomb structure was dried at a temperature of 110° C. for 1 hour. The dried honeycomb structure was calcined at a temperature of 400° C. for 1 hour, thereby preparing a honeycomb structure including a denitration catalyst.

Comparative Example 2

For the purpose of the comparison, a denitration catalyst was prepared according to a similar procedure as in the Example 2. The difference of the procedure here from that in the Example 2 is that the ammonium metavanadate (AMV) (a) powder (manufactured by Taiyo Koko Co., Ltd.) having a large particle diameter in a related art which has a particle size distribution shown in the FIG. 1 was used here.

<Experiment for Performance Evaluation of Denitration Catalyst>

Figure 3:
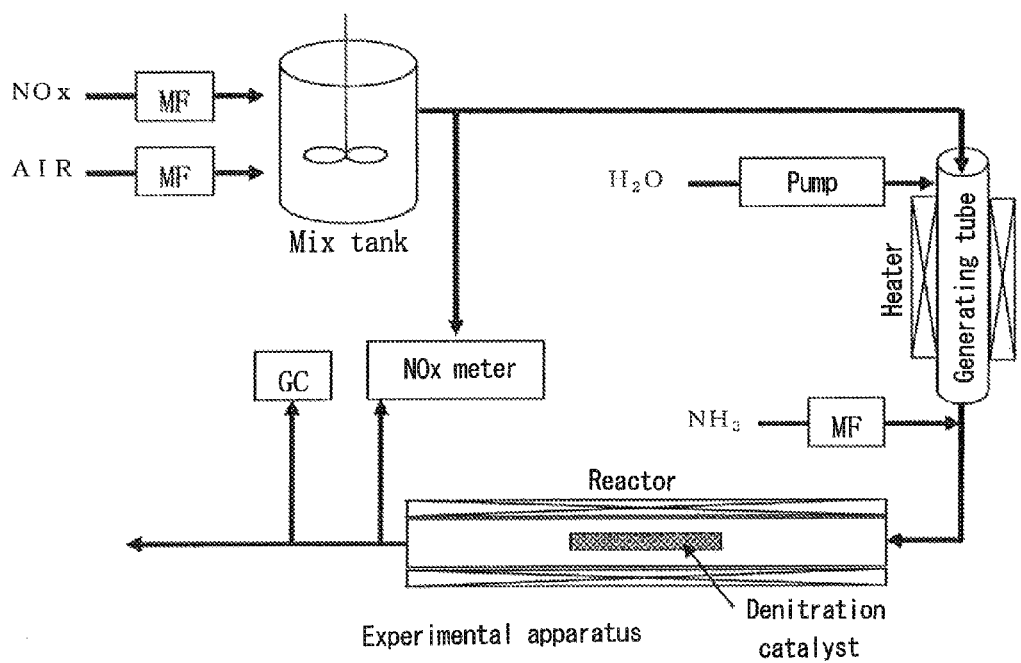
FIG. 3 is a flow sheet for a denitration experiment apparatus for evaluating capability of a denitration catalyst.

Next, the denitration catalysts prepared in the Examples 1 and 2 and the Comparative Examples 1 and 2 were evaluated in their catalytic denitration capabilities using an apparatus for denitration experiment, whose flow sheet is shown in FIG. 3.

In the apparatus for denitration experiment shown in the FIG. 3, nitrogen oxides (NOx) gas and air were supplied by means of respective flowmeters (MFs) to a mix tank in a predetermined proportion and the gas mixture was agitated. Next, the gas to be actually supplied to a reactor from the mix tank was quantitatively metered and fed into a generating tube for heating the gas by a heater. The excessive gas was mostly discharged and a part thereof was measured in the concentration of nitrogen oxides (NOx) as an inlet gas concentration by a nitrogen oxide (NOx) meter. At this time, the nitrogen oxide (NOx) concentration in the gas mixture was 100 ppm.

Before the generating tube, a constant amount of water was supplied, with a metering pump to add water vapor to the gas mixture in such an amount to be 10% by volume. Ammonia ($NH_3$) gas was added to the gas mixture after passing through the generating tube in a predetermined proportion with a flowmeter (F), and the resulting gas mixture was introduced into the reactor including a denitration catalyst. The nitrogen oxides (NOx) was reacted with ammonia ($NH_3$) which acts as a reducing agent under a reaction temperature of 400° C. and a catalyst area velocity (AV) of 50 m/h, thereby conducting a decomposition reaction of the nitrogen oxides into nitrogen ($N_2$) and water ($H_2O$).

The quantity of nitrogen oxides in the gas discharged from the reactor was measured by a nitrogen oxide (NOx) meter and a gas chromatography (GC), and the obtained results are collectively shown in Table 1.

TABLE 1

| | Denitration rate |
|---|---|
| Example 1 | 0.681 |
| Comparative Example 1 | 0.609 |
| Example 2 | 0.633 |
| Comparative Example 2 | 0.548 |

As can be seen from the results in Table 1 above, the denitration catalysts prepared in Examples 1 and 2 of the present invention exhibited denitration rates about 10% higher than those of the denitration catalysts prepared in Comparative Examples 1 and 2, respectively. Thus, the catalytic activity was able to be enhanced by using ammonium metavanadate (AMV) (b) powder having a small particle diameter.

In addition, since a reclaimed product including vanadium recovered from petroleum-based combustion ash such as heavy oil ash was used as the AMV (b) powder, an increase in the cost of producing the denitration catalyst was not involved.

The invention claimed is:

1. A method for preparing a denitration catalyst which includes titanium oxide, vanadium and tungsten as catalytic active ingredients thereof comprising:
    adding a titanium oxide powder to a mixture liquid of a silica sol and water to prepare a slurry;
    adding an ammonium metavanadate powder to this slurry;
    adding an aqueous solution of ammonium metatungstate to the slurry; and
    immersing a honeycomb structure in the slurry;
   wherein the ammonium metavanadate powder contains
    particles having a particle diameter of 10 μm or less in a cumulative content of 20% to 30%,
    particles having a particle diameter of more than 10 μm and 27 μm or less in a cumulative content of 20 to 30%,
    particles having a particle diameter of more than 27 μm and 60 μm or less in a cumulative content of 25 to 35%, and
    particles having a particle diameter of more than 60 μm and 250 μm or less in a cumulative content of 15 to 25%,
    based on a total number of the ammonium metavanadate powder particles.

2. The method for preparing a denitration catalyst according to claim 1, characterized in that the ammonium metavanadate powder is a reclaimed product including vanadium recovered from petroleum-based combustion ash, such as heavy oil ash.

3. A method for preparing a denitration catalyst which includes titanium oxide, vanadium and tungsten as catalytic active ingredients thereof comprising:
    adding titanium oxide powder to a mixture liquid of a silica sol and water to prepare a slurry;
    immersing a honeycomb structure in the slurry;
    immersing the honeycomb structure having the titanium oxide powder supported thereon in an aqueous solution of an ammonium metavanadate powder, and
    immersing the honeycomb structure having the titanium oxide powder and the ammonium metavanadate supported thereon in an aqueous solution of ammonium metatungstate;
   wherein the ammonium metavanadate powder contains
    particles having a particle diameter of 10 μm or less in a cumulative content of 20% to 30%,
    particles having a particle diameter of more than 10 μm and 27 μm or less in a cumulative content of 20 to 30%,
    particles having a particle diameter of more than 27 μm and 60 μm or less in a cumulative content of 25 to 35%, and
    particles having a particle diameter of more than 60 μm and 250 μm or less in a cumulative content of 15 to 25%,
    based on a total number of the ammonium metavanadate powder particles.

4. The method for preparing a denitration catalyst according to claim 3, characterized in that the ammonium metavanadate powder is a reclaimed product including vanadium recovered from petroleum-based combustion ash, such as heavy oil ash.

* * * * *